United States Patent
Zias

(10) Patent No.: US 9,141,522 B1
(45) Date of Patent: Sep. 22, 2015

(54) VIRTUAL CLUSTER IMMUNE SYSTEM FOR DYNAMIC TESTING

(71) Applicant: INTUIT INC., Mountain View, CA (US)

(72) Inventor: Jeff Alan Zias, Los Altos, CA (US)

(73) Assignee: INTUIT INC., Mountain View, CA (US)

( * ) Notice: Subject to any disclaimer, the term of this patent is extended or adjusted under 35 U.S.C. 154(b) by 186 days.

(21) Appl. No.: 13/732,842

(22) Filed: Jan. 2, 2013

(51) Int. Cl.
*G06F 11/00* (2006.01)
*G06F 11/36* (2006.01)

(52) U.S. Cl.
CPC .................................. *G06F 11/3692* (2013.01)

(58) Field of Classification Search
CPC ............ G06F 11/3688; G06F 11/3676; G06F 11/3684; G06F 11/3636; G06F 11/3664; G06F 11/3692
USPC ........................................................ 714/38.1
See application file for complete search history.

(56) References Cited

U.S. PATENT DOCUMENTS

| | | | |
|---|---|---|---|
| 6,379,314 B1* | 4/2002 | Horn | 600/559 |
| 8,276,123 B1* | 9/2012 | Deng et al. | 717/125 |
| 2005/0273767 A1* | 12/2005 | Achlioptas et al. | 717/132 |
| 2008/0244322 A1* | 10/2008 | Kelso | 714/38 |
| 2014/0123114 A1* | 5/2014 | Navalur et al. | 717/127 |

* cited by examiner

*Primary Examiner* — Yair Leibovich
(74) *Attorney, Agent, or Firm* — Park, Vaughan, Fleming & Dowler LLP; Steven E. Stupp

(57) ABSTRACT

During a testing technique, a pre-defined set of tests associated with a software product may be performed on different instances or versions of the software product (such as versions that have different user interfaces) in associated virtual environments. Moreover, during a given test, subsets of a group of individuals may interact with a given version of the software product. Initially, the subsets may be selected based on attributes of the individuals, such as: age, gender, occupation, and/or education level. However, subsequently the results of the executed pre-defined set of tests may be used to update the subsets. Furthermore, the testing technique may be repeated until a termination criterion is reached, such as a target use case of one or more of the subsets. In this way, the testing technique may be used to perform permutation testing.

18 Claims, 5 Drawing Sheets

VIRTUAL CLUSTER IMMUNE SYSTEM FOR DYNAMIC TESTING

BACKGROUND

The present disclosure relates to a technique for testing of a software product. More specifically, the present disclosure relates to dynamically testing the software product using a virtual cluster immune system.

Errors or bugs in a software product can result in system crashes and a poor user experience. Therefore, software products are typically extensively tested to identify and correct bugs. In principle, this testing may involve a variety of complicated tests or experiments, which, ideally, can be performed quickly so that the software-development time is not too long. However, if the experiments are not isolated from each other in a computer system (such as a server farm), they can interfere with each other, which may make it more difficult to correctly test the software product.

One approach for addressing the challenge of such interference is to test the software product in a cluster immune system, which provides a safe environment or area in which the software product is in an isolated cluster or subset of the computer system so that only a select group of customers can try it. In this way, the different experiments cannot interfere with each other.

While this approach offers a controlled way to test the software product, it can be difficult to thoroughly test the software product using a cluster immune system. In particular, it can be difficult to rapidly and intelligently perform a sequence of tests on the software product using a cluster immune system because the iteration rate is often restricted by conflict issues within the cluster immune system. Moreover, the analysis operations that are based on the results of the tests in a cluster immune system are often performed by a human operator of the cluster immune system. As a consequence, the results of the testing in a cluster immune system are often less accurate and can be dated because of the long time between tests.

SUMMARY

The disclosed embodiments relate to a computer system that facilitates dynamic testing of a software product. During operation, the computer system receives a pre-defined set of tests associated with the software product. Then, the computer system generates virtual environments corresponding to subsets of a group of individuals. Moreover, the computer system executes the pre-defined set of tests in the virtual environments, where, during a given test, individuals in a corresponding subset interact with the software product. Next, the computer system analyzes results of the executed pre-defined set of tests, and updates the subsets based on the analysis. Furthermore, the computer system repeats the executing, analyzing and updating operations until a termination criterion is reached.

Note that the pre-defined set of tests may be associated with a user interface in the software product. Moreover, the pre-defined set of tests may be based on a test hypothesis. In some embodiments, the pre-defined set of tests is executed sequentially.

Furthermore, prior to executing the pre-defined set of tests for a first time, the computer system may select the subsets based on one or more attributes of individuals in the group of individuals. For example, the attributes may include: age, gender, occupation, and/or education level.

Additionally, updating the subsets may facilitate permutation testing of the software product.

In some embodiments, while executing the pre-defined set of tests, different subsets interact with different versions of the software product. For example, the different versions may include different presentations of the user interface associated with the software product.

Moreover, the termination criterion may include a target use case of one or more of the subsets.

Another embodiment provides a method that includes at least some of the operations performed by the computer system.

Another embodiment provides a computer-program product for use with the computer system. This computer-program product includes instructions for at least some of the operations performed by the computer system.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for dynamic testing of a software product, and a computer-program product (e.g., software) for use with the computer system are described. During this testing technique, a pre-defined set of tests associated with the software product may be performed on different instances or versions of the software product (such as versions that have different user interfaces) in associated virtual environments. Moreover, during a given test, subsets of a group of individuals (which are sometimes referred to as 'cohorts') may interact with a given version of the software product. Initially, the subsets may be selected based on attributes of the individuals, such as: age, gender, occupation, and/or education level. However, subsequently the results of the executed pre-defined set of tests may be used to update the subsets. Furthermore, the testing technique may be repeated until a termination criterion is reached, such as a target use case of one or more of the subsets.

By dynamically updating the subsets, the testing technique may facilitate testing with individuals, thereby allowing their behaviors to be measured. For example, using the testing technique, the computer system may be able to perform a succession of split tests based on tracked behaviors of the individuals in the subsets. Thus, the testing technique may facilitate permutation testing of the software product using new and repeated subsets of the group of individuals. In addition, by providing virtual environments for each of the subsets, the testing technique may incorporate the isolation provided by a cluster immune system, so that the pre-defined set of tests performed with the different subsets do not interfere with each other. As a consequence, the testing technique may provide an 'intelligent' cluster immune system for safe, fast and accurate testing of the software product. This capability may facilitate shorter software-development cycles and may allow user behavioral feedback to be included when developing software products, thereby enhancing software innovation and quality.

In the discussion that follows, a user or an individual may include: a person (for example, an existing customer, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

Figure 1:
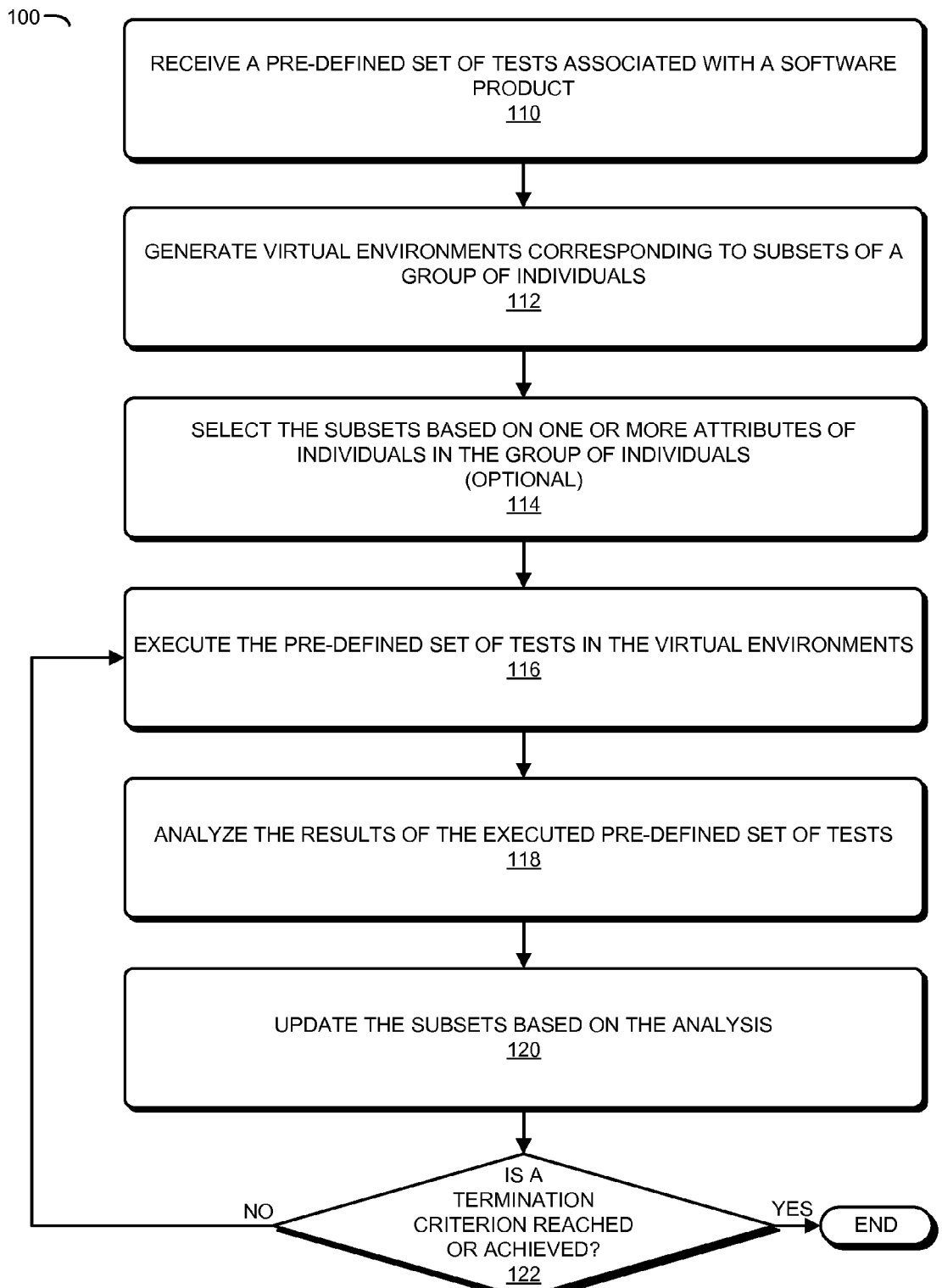
FIG. 1 is a flow chart illustrating a method for dynamic testing of a software product in accordance with an embodiment of the present disclosure.

We now describe embodiments of the testing technique. FIG. 1 presents a flow chart illustrating a method 100 for dynamic testing of a software product, which may be performed by a computer system (such as computer system 500 in FIG. 5). During operation, the computer system receives a pre-defined set of tests associated with the software product (operation 110). For example, an operator or user of the computer system may specify a pre-defined set of tests based on a hypothesis, such as a numerical hypothesis. In an exemplary embodiment, the pre-defined set of tests is associated with a user interface of the software product, and the hypothesis may involve a use case, such as an 'if then' behavior of users when interacting with the user interface and, more generally, the software product.)

Then, the computer system generates virtual environments corresponding to subsets of a group of individuals (operation 112). These virtual environments may effectively provide isolation during the testing (and, thus, in the results) for the different subsets (i.e., the virtual environments may provide the advantages of a cluster immune system).

Moreover, the computer system executes the pre-defined set of tests in the virtual environments (operation 116), where, during a given test in the pre-defined set of tests, individuals in a corresponding subset interact with the software product. Note that, during execution of the pre-defined set of tests, the tests may be executed sequentially.

Next, the computer system analyzes results of the executed pre-defined set of tests (operation 118), and updates the subsets based on the analysis (operation 120). If a termination criterion is reached or achieved (operation 122), method 100 ends. Otherwise, if the termination criterion is not reached or achieved (operation 122), the computer system repeats the executing (operation 116), analyzing (operation 118) and updating (operation 120). This termination criterion may include a target use case of one or more of the subsets, such as individuals being able to successfully use the user interface in a particular way without needing to access help instructions. Thus, dynamic updates to the subsets during method 100 may facilitate permutation testing of the software product so that user behavior feedback can be incorporated in an eventual release of the software product and/or an appropriate use base for the software product can be identified.

In some embodiments, prior to executing the pre-defined set of tests (operation 116) for a first time, the computer system optionally selects the subsets based on one or more attributes of individuals in the group of individuals (operation 114). For example, the attributes may include: age, gender, occupation, and/or education level. Thus, one of the subsets may include college-aged individuals, while another may include baby boomers.

Additionally, while executing the pre-defined set of tests (operation 116), different subsets may interact with different versions of the software product. For example, as described further below with reference to FIG. 3, the different versions may include different presentations or versions of the user interface associated with the software product.

Figure 2:
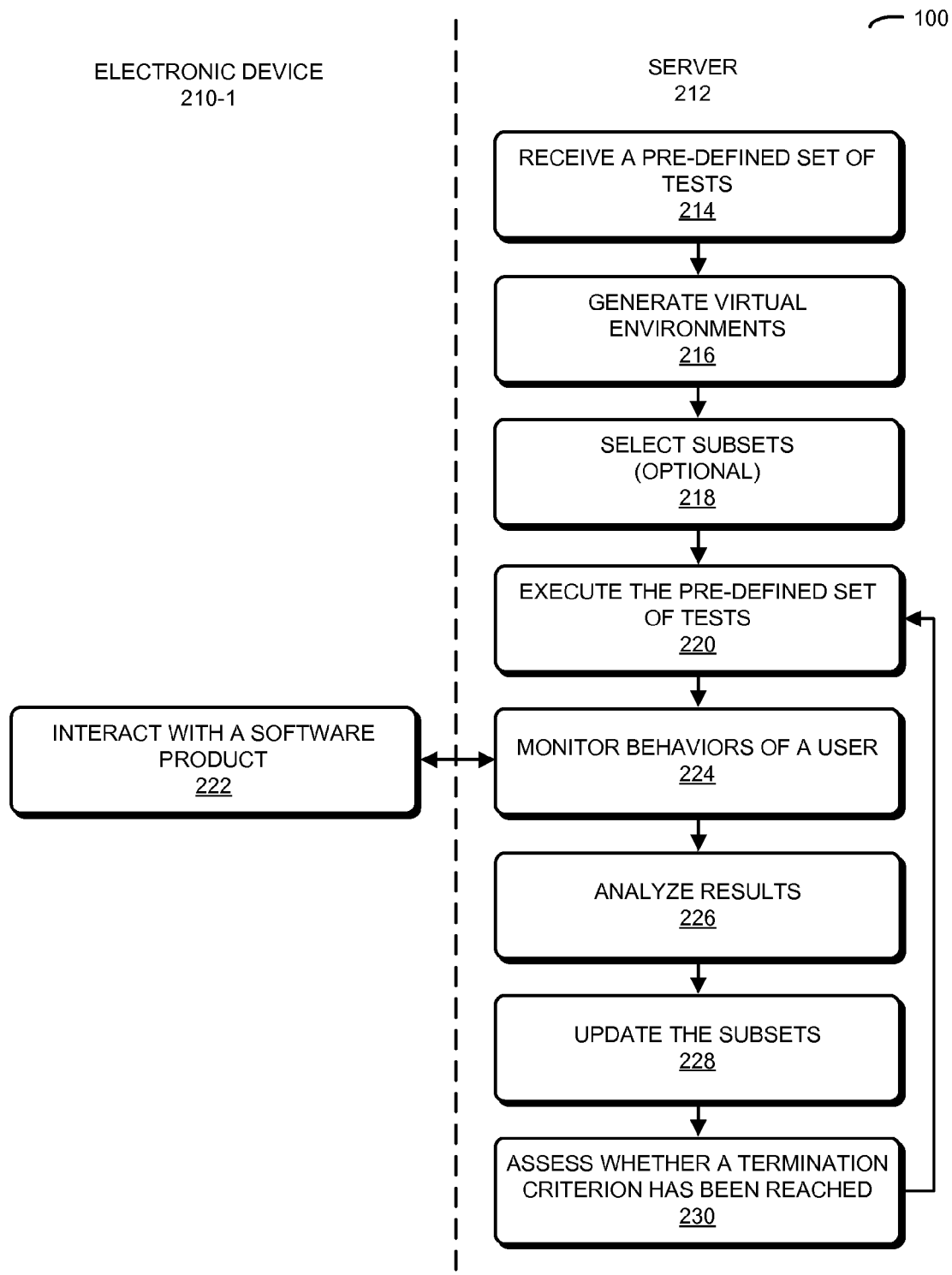
FIG. 2 is a flow chart illustrating the method of FIG. 1 in accordance with an embodiment of the present disclosure.

In an exemplary embodiment, the testing technique is implemented using electronic devices (such as computers or portable electronic devices, e.g., cellular telephones) and at least one server, which communicate through a network, such as a cellular-telephone network and/or the Internet (e.g., using a client-server architecture). This is illustrated in FIG. 2, which presents a flow chart illustrating method 100 (FIG. 1). In this example, the interactions between server 212 and one of the electronic devices (electronic device 210-1) are used as an illustration of the testing technique.

During the method, server 212 may receive a pre-defined set of tests (operation 214) associated with the software product. Then, server 212 may generate virtual environments (operation 216) corresponding to the subsets of the group of individuals. Moreover, server 212 optionally selects the subsets (operation 218) based on one or more attributes of individuals in the group of individuals.

Next, server 212 executes the pre-defined set of tests (operation 220) in the virtual environments. During a given test in the pre-defined set of tests, individuals in a corresponding subset interact with the software product. For example, a user of electronic device 210-1 may interact with the software product (operation 222) and server 212 may monitor the behaviors of the user (operation 224).

Furthermore, server 212 may analyze the results (operation 226) of the executed pre-defined set of tests, and may update the subsets (operation 228) based on the analysis. Additionally, server 212 may assess whether a termination criterion has been reached (operation 230). If not, server 212 may repeat a portion of method 100 starting at operation 220.

In some embodiments of method 100 (FIGS. 1 and 2), there may be additional or fewer operations. Moreover, the order of the operations may be changed, and/or two or more operations may be combined into a single operation.

In an exemplary embodiment, the testing technique facilitates testing of customer reaction to a software product (such as a new version of an existing software product), thereby enhancing innovation and the user experience. This testing can be performed rapidly (with short test turn-around time) using intelligent, dynamic updates to the subsets of the group of individuals that interact with different versions of the software product in associated virtual environments. These dynamic user placements executed by the intelligent cluster immune system provide more live data (including a large amount of customer behavioral feedback) and, thus, a more accurate view of a given user base. For example, using the testing technique dozens of experiments can be conducted each day using different splits or cohorts (which include different types of users or customers) and a large sequence or set of tests (such as a set with dozens of tests).

Using the testing technique, separate tests can be configured easily and launched without the risk of interfering with other tests. In addition, the computer system that implements the testing technique may include the intelligence to know how to track and report over time. For example, the virtual environments may be capable of tracking which users have been tested so that the same and/or different cohorts can be used in different instances of the testing cycles in server clusters.

As noted previously, in an exemplary embodiment, the virtualization of the configurations may be implemented on top of server clusters that interact with the subgroups during the testing. For example, there may be four demographic groups and the set of tests may include five or six different flows in a software product. While accurate testing in such cases may involve a combinatorial explosion of different permutations, the intelligent testing facilitated by the testing technique may allow these permutations to be systematically and efficiently assessed in different subsets of the group of individuals (for example, using a tree of logical permutations on the set of tests).

In an exemplary embodiment, each of the four demographic groups may be one of the initial subgroups. The testing technique may define a different virtual (or virtualized) cluster for each of the demographic groups. Each of these virtual clusters may provide a clean environment so the testing on the different subgroups does not pollute each other. Moreover, the tests in each virtual cluster may be executed in sequence based on a pre-defined set of experiments or tests (e.g., things the operator of the intelligent immune cluster system wants to learn).

Based on the results of the testing (such as what excites and attracts the individuals in the different demographic groups when they interact with the software product and, more generally, behaviors when using the software product), the subgroups can be adapted, and the testing can be repeated to refine the acquisition and retention of knowledge about user behaviors. For example, the behaviors monitored when subgroup A was tested, versus those that were monitored when subgroup B was tested, can be used to adapt the subgroups in subsequent testing. Thus, the configurations of the different virtual clusters can be dynamically changed (such as splitting the four demographic groups) to test different combinations of individuals in the four demographic groups. This testing technique allows test cycles to start, restart and complete much faster so that software-development cycles can be sped-up significantly.

In an exemplary embodiment, the testing technique is used to implement quantitative experimentation, such as to determine whether a version of a user interface in a software product will allow a number of individuals (such as 100 individuals) in a particular age group (such as younger than college age, college age, baby boomer or senior citizen) to perform or enter two tasks within a time interval (such as 12 hours). More generally, the subgroups may be based on demographic attributes such as: age, gender, occupation, education, etc. However, in other embodiments, a wide variety of attributes may be used, such as nationality, race, sex, income level, geographic location (e.g., metropolitan or rural, East Coast or West Coast), etc. Therefore, in some embodiments the subgroups may be selected based on attributes other than demographic attributes.

During the testing, the different subgroups may be presented different versions of a landing page in the software product. The behavior of the individuals may be monitored during the testing to see if they were able to create two or more problems to solve using the different landing pages. If none of the subgroups is able to achieve this goal (i.e., the termination criterion), different subgroups may be generated based on the attributes and/or the testing results, and the experiment may be repeated using the pre-defined set of tests (or a new experiment may be performed using a new set of tests).

Figure 3:
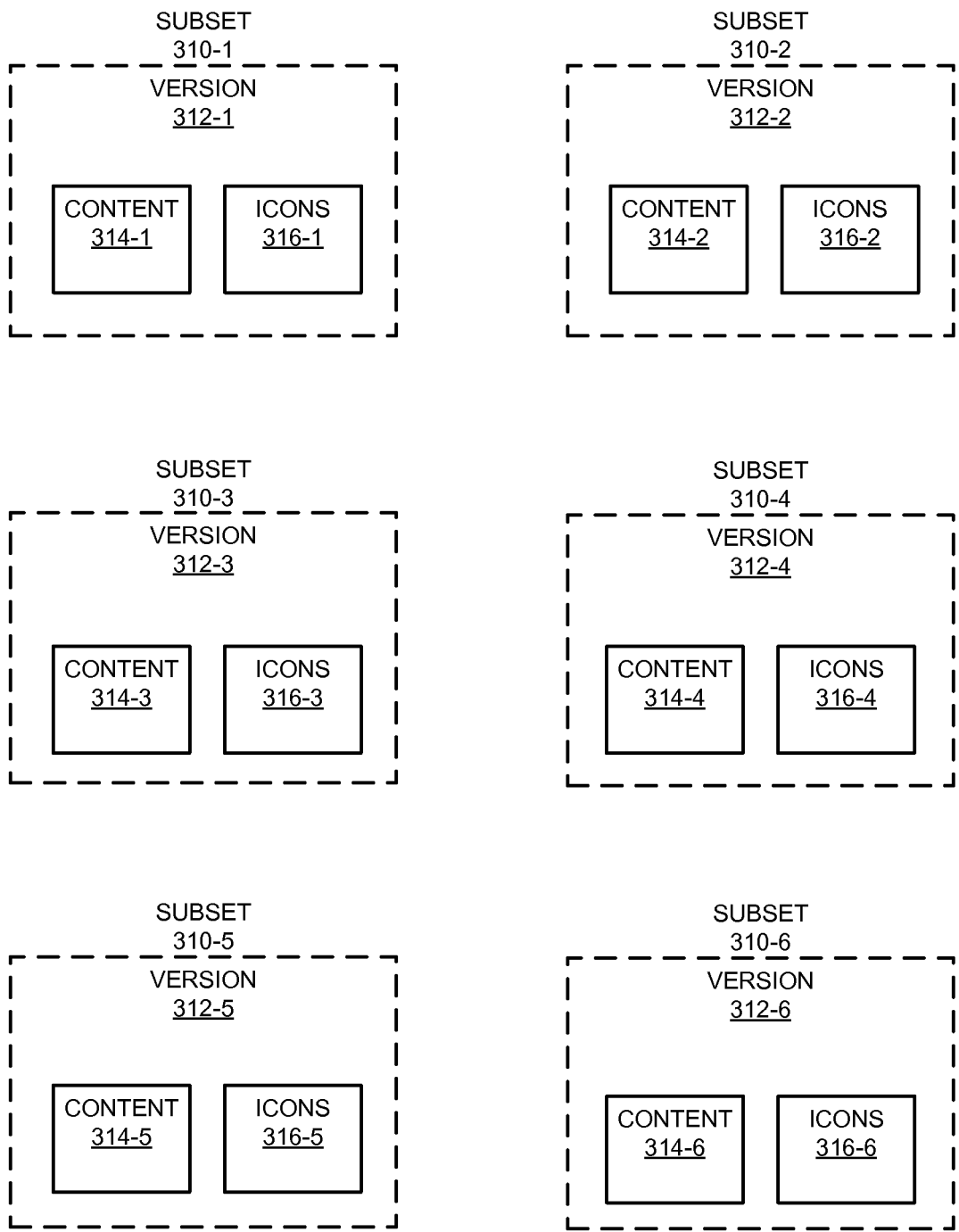
FIG. 3 is a drawing illustrating different versions of a user interface in a software product in accordance with an embodiment of the present disclosure.

In another exemplary embodiment, the testing technique is used to test a new user interface for a software product. In particular, company A may want to introduce an easy-to-use user interface for people who do not perform well or enjoy using a current user interface (e.g., based on quantitative path analysis or a funnel-metrics model). For those users who seem to struggle when trying to find certain commands or icons, a new user interface may be presented to them the next time they access the software product (for example, via the Internet). However, those users who performed well using the current user interface may experience a different set of tests during their next session. This is shown in FIG. 3, which presents different versions 312 of the user interface (including different content 314 and/or icons 316) that are presented to different subsets 310.

In this way, the test results can be cross-tabulated across the cohorts who responded to the previous instance of the testing in a certain way. Company A can set parameters to then divide cohorts based on one or more criteria (such as the age, net worth, etc. of the users) and, therefore, can create a new dynamic cohort split to test.

Figure 4:
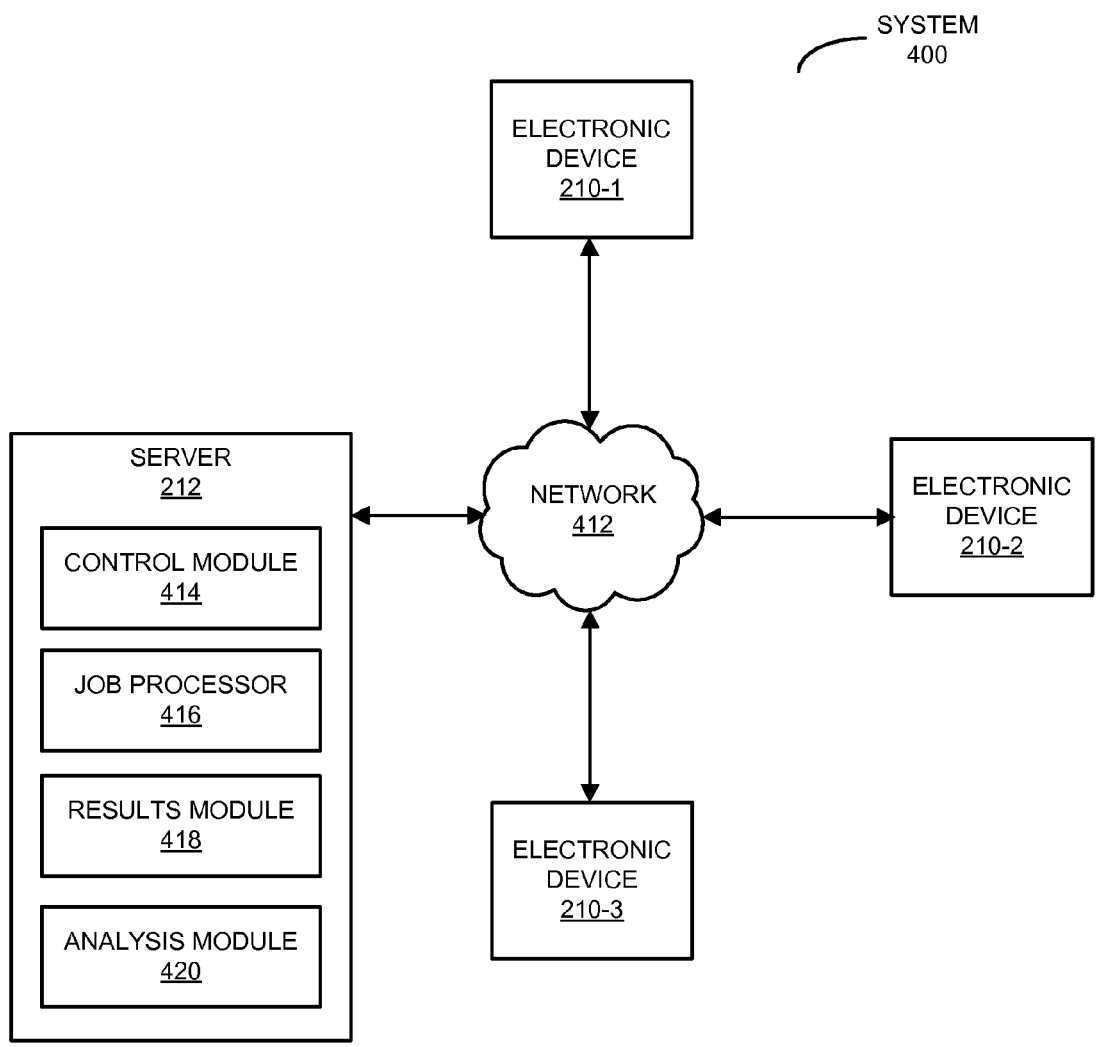
FIG. 4 is a block diagram illustrating a system that performs the method of FIGS. 1 and 2 in accordance with an embodiment of the present disclosure.

We now describe embodiments of a system and the computer system, and their use. FIG. 4 presents a block diagram illustrating a system 400 that can be used, in part, to perform operations in method 100 (FIGS. 1 and 2). In this system, during the testing technique users of electronic devices 210 may use a software product, such as a software application that is resident on and that executes on electronic devices 210. (Alternatively, the users may interact with one or more web page(s) that are provided by server 212 via network 412, and which are rendered by web browsers on electronic devices 210. For example, at least a portion of the software application may be an application tool that is embedded in the one or more web page(s), and which executes in a virtual environment of the web browsers. Thus, the application tool may be provided to the user via a client-server architecture.) This software application may be a standalone application or a portion of another application that is resident on and which executes on electronic devices 210 (such as a software application that is provided by server 212 or that is installed and which executes on electronic devices 210).

During the testing technique, control module 414 may receive a pre-defined set of tests associated with the software product. Then, control module 414 may generate virtual environments corresponding to the subsets of the group of individuals. Moreover, control module 414 may optionally select the subsets based on one or more attributes of individuals (i.e., the users) in the group of individuals.

Next, job processor 416 executes the pre-defined set of tests in the virtual environments for the different subsets. For example, users of electronic devices 210 may interact with different presentations of the software product (and, more generally, different instances or versions of the software product), and results module 418 may monitor the behaviors of the users. In some embodiments, the users are tracked in network 412 using the Internet Protocol and cookie value when interacting with the software product via a virtualized front end. Using a programmable or load-balancing switch, the context may be tracked so that results module 418 remains aware of the relationship between the pre-defined set of tests and the test sequence to the users. Subsequently, if control module 414 updates the subsets, this tracked information may allow users to be diverted to different clusters based on a regular-expression type script that declares what needs to be tested (i.e., the test/experiments list or a 'playlist').

Furthermore, analysis module 420 may analyze the results of the executed pre-defined set of tests, and (as noted above) control module 414 may update the subsets based on the analysis. Additionally, control module 414 may assess whether a termination criterion has been reached. If not, job processor 416, results module 418 and analysis module 420 may repeat the testing using the updated subsets. In particular, the virtual clusters may be dynamically reconfigured via re-scripting to new test cases or subgroups, thereby implementing the new cohort splits.

Note that information in system 400 may be stored at one or more locations in system 400 (i.e., locally or remotely). Moreover, because this data may be sensitive in nature, it may be encrypted. For example, stored data and/or data communicated via network 412 may be encrypted.

Figure 5:
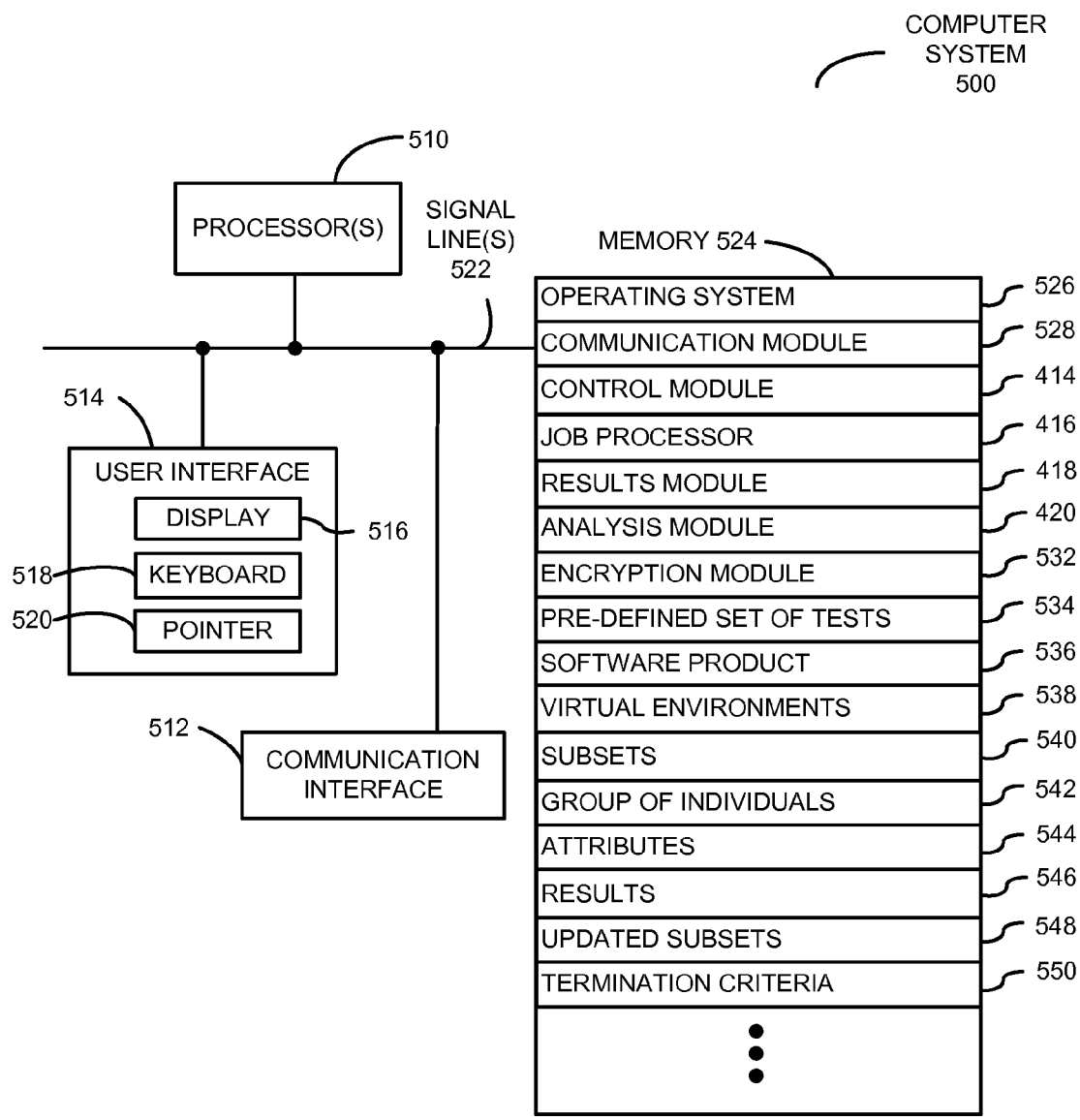
FIG. 5 is a block diagram illustrating a computer system that performs the method of FIGS. 1 and 2 in accordance with an embodiment of the present disclosure.

FIG. 5 presents a block diagram illustrating a computer system 500 that performs method 100 (FIGS. 1 and 2), such as server 212 (FIGS. 2 and 4). Computer system 500 includes one or more processing units or processors 510, a communication interface 512, a user interface 514, and one or more signal lines 522 coupling these components together. Note that the one or more processors 510 may support parallel processing and/or multi-threaded operation, the communication interface 512 may have a persistent communication connection, and the one or more signal lines 522 may constitute a communication bus. Moreover, the user interface 514 may include: a display 516, a keyboard 518, and/or a pointer 520, such as a mouse.

Memory 524 in computer system 500 may include volatile memory and/or non-volatile memory. More specifically, memory 524 may include: ROM, RAM, EPROM, EEPROM, flash memory, one or more smart cards, one or more magnetic disc storage devices, and/or one or more optical storage devices. Memory 524 may store an operating system 526 that includes procedures (or a set of instructions) for handling various basic system services for performing hardware-dependent tasks. Memory 524 may also store procedures (or a set of instructions) in a communication module 528. These communication procedures may be used for communicating with one or more computers and/or servers, including computers and/or servers that are remotely located with respect to computer system 500.

Memory 524 may also include multiple program modules (or sets of instructions), including: control module 414 (or a set of instructions), job processor 416 (or a set of instructions), results module 418 (or a set of instructions), analysis module 420 (or a set of instructions) and/or encryption module 532 (or a set of instructions). Note that one or more of these program modules (or sets of instructions) may constitute a computer-program mechanism.

During the testing technique, control module 414 may receive a pre-defined set of tests 534 associated with software product 536. Then, control module 414 may generate virtual environments 538 corresponding to subsets 540 of group of individuals 542. Moreover, control module 414 may optionally select subsets 540 based on one or more attributes 544 of individuals in group of individuals 542.

Next, job processor 416 executes pre-defined set of tests 534 in virtual environments 538 for different subsets 540, and results module 418 may monitor behaviors of the individuals (and, more generally, results 546 of the testing). Furthermore, analysis module 420 may analyze results 546 of the executed pre-defined set of tests 534, and control module 414 may update subsets 540 to create updated subsets 548 based on the analysis. Additionally, control module 414 may assess whether one or more termination criteria 550 have been reached or achieved. If not, job processor 416, results module 418 and analysis module 420 may repeat the testing using updated subsets 548.

Note that encryption module 532 may be used to encrypt or decrypt at least some of the information generated or conveyed during the testing.

Instructions in the various modules in memory 524 may be implemented in: a high-level procedural language, an object-oriented programming language, and/or in an assembly or machine language. Note that the programming language may be compiled or interpreted, e.g., configurable or configured, to be executed by the one or more processors 510.

Although computer system 500 is illustrated as having a number of discrete items, FIG. 5 is intended to be a functional description of the various features that may be present in computer system 500 rather than a structural schematic of the embodiments described herein. In some embodiments, some or all of the functionality of computer system 500 may be implemented in one or more application-specific integrated circuits (ASICs) and/or one or more digital signal processors (DSPs).

Computer system 500, as well as electronic devices, computers and servers in system 400 (FIG. 4), may include one of a variety of devices capable of manipulating computer-readable data or communicating such data between two or more computing systems over a network, including: a personal computer, a laptop computer, a tablet computer, a mainframe computer, a portable electronic device (such as a cellular telephone or PDA), a server, a point-of-sale terminal and/or a client computer (in a client-server architecture). Moreover, network 412 (FIG. 4) may include: the Internet, World Wide Web (WWW), an intranet, a cellular-telephone network, LAN, WAN, MAN, or a combination of networks, or other technology enabling communication between computing systems.

Electronic devices 210 (FIGS. 2 and 4), server 212 (FIGS. 2 and 4), system 400 (FIG. 4), and/or computer system 500 may include fewer components or additional components. Moreover, two or more components may be combined into a single component, and/or a position of one or more components may be changed. In some embodiments, the functionality of electronic devices 210 (FIGS. 2 and 4), server 212 (FIGS. 2 and 4), system 400 (FIG. 4) and/or computer system 500 may be implemented more in hardware and less in software, or less in hardware and more in software, as is known in the art.

In the preceding description, we refer to 'some embodiments.' Note that 'some embodiments' describes a subset of all of the possible embodiments, but does not always specify the same subset of embodiments.

While the set of tests was pre-defined in the preceding discussion, in other embodiments the set of tests may be dynamically selected or generated during the testing technique.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-system-implemented method for dynamic testing of a software product, the method comprising:

receiving a pre-defined set of tests associated with the software product;

generating virtual environments corresponding to subsets of a group of individuals;

using the computer system, executing the pre-defined set of tests in the virtual environments, wherein, during a given test in the pre-defined set of tests, individuals in a corresponding subset interact with the software product, wherein, prior to executing the pre-defined set of tests for a first time, selecting the subsets based on one or more attributes of individuals in the group of individuals;

analyzing results of the executed pre-defined set of tests;

updating the subsets based on the analysis; and repeating the executing, analyzing and updating operations until a termination criterion is reached.

2. The method of claim 1, wherein the pre-defined set of tests is associated with a user interface in the software product.

3. The method of claim 1, wherein the pre-defined set of tests is based on a test hypothesis.

4. The method of claim 1, wherein the pre-defined set of tests is executed sequentially.

5. The method of claim 1, wherein the attributes include one of: age, gender, occupation, and education level.

6. The method of claim 1, wherein updating the subsets facilitates permutation testing of the software product.

7. The method of claim 1, wherein, while executing the pre-defined set of tests, different subsets interact with different versions of the software product.

8. The method of claim 7, wherein the different versions include different presentations of a user interface associated with the software product.

9. The method of claim 1, wherein the termination criterion includes a target use case of one or more of the subsets.

10. A computer-program product for use in conjunction with an electronic device, the computer-program product comprising a non-transitory computer-readable storage medium and a computer-program mechanism embedded therein to facilitate dynamic testing of a software product, the computer-program mechanism including:

instructions for receiving a pre-defined set of tests associated with the software product;

instructions for generating virtual environments corresponding to subsets of a group of individuals;

instructions for executing the pre-defined set of tests in the virtual environments, wherein, during a given test in the pre-defined set of tests, individuals in a corresponding subset interact with the software product, wherein, the instructions further comprise prior to executing the pre-defined set of tests for a first time, selecting the subsets based on one or more attributes of individuals in the group of individuals;

instructions for analyzing results of the executed pre-defined set of tests;

instructions for updating the subsets based on the analysis; and instructions for repeating the executing, analyzing and updating operations until a termination criterion is reached.

11. The computer-program product of claim 10, wherein the pre-defined set of tests is associated with a user interface in the software product.

12. The computer-program product of claim 10, wherein the pre-defined set of tests is executed sequentially.

13. The computer-program product of claim 10, wherein the attributes include one of: age, gender, occupation, and education level.

14. The computer-program product of claim 10, wherein updating the subsets facilitates permutation testing of the software product.

15. The computer-program product of claim 10, wherein, while executing the pre-defined set of tests, different subsets interact with different versions of the software product.

16. The computer-program product of claim 15, wherein the different versions include different presentations of a user interface associated with the software product.

17. The computer-program product of claim 10, wherein the termination criterion includes a target use case of one or more of the subsets.

18. A computer system, comprising:

a hardware processor;

memory; and a program module, wherein the program module is stored in the memory and configurable to be executed by the processor to facilitate dynamic testing of a software product, the program module including:

instructions for receiving a pre-defined set of tests associated with the software product;

instructions for generating virtual environments corresponding to subsets of a group of individuals;

instructions for executing the pre-defined set of tests in the virtual environments, wherein, during a given test in the pre-defined set of tests, individuals in a corresponding subset interact with the software product, wherein, the instructions further comprise prior to executing the pre-defined set of tests for a first time, selecting the subsets based on one or more attributes of individuals in the group of individuals;

instructions for analyzing results of the executed pre-defined set of tests;

instructions for updating the subsets based on the analysis; and instructions for repeating the executing, analyzing and updating operations until a termination criterion is reached.

* * * * *